United States Patent [19]

Sorby

[11] Patent Number: 5,052,594
[45] Date of Patent: Oct. 1, 1991

[54] CONTAINER FILLING NOZZLE MADE OF ELASTOMERIC MATERIAL

[75] Inventor: Tore Sørby, Hokksund, Norway

[73] Assignee: Elopak Systems A.G., Zurich, Switzerland

[21] Appl. No.: 467,671

[22] Filed: Jan. 19, 1990

[30] Foreign Application Priority Data

Jan. 21, 1989 [GB] United Kingdom ............... 8901320

[51] Int. Cl.⁵ ............................................. F16K 23/00
[52] U.S. Cl. .................................. 222/490; 222/494; 222/571; 137/849
[58] Field of Search ...................... 222/490, 494, 571; 137/847, 848, 849

[56] References Cited

U.S. PATENT DOCUMENTS

| | | | |
|---|---|---|---|
| 2,005,642 | 6/1935 | Thornton | 222/541 |
| 2,611,515 | 9/1952 | Smith | 222/490 |
| 3,861,416 | 1/1975 | Wichterle | 137/849 |
| 3,896,849 | 7/1975 | Ervin et al. | 137/847 |
| 4,492,253 | 1/1985 | Raftis | 137/849 |

FOREIGN PATENT DOCUMENTS

| | | | |
|---|---|---|---|
| 478810 | 3/1953 | Italy | 222/494 |
| 2095584 | 10/1982 | United Kingdom | 137/849 |

OTHER PUBLICATIONS

Vernay Laboratories Inc., first page.

*Primary Examiner*—Michael S. Huppert
*Assistant Examiner*—Anthoula Pomrening
*Attorney, Agent, or Firm*—John C. Evans

[57] ABSTRACT

A container filling nozzle of rubber has a wide, substantially square, inlet opening and a cruciform outlet slit which, in the absence of external force, is maintained closed owing to the resilience of the rubber. In the zone of the slit, the internal surface of the nozzle wall is formed with protrusions which extend along both sides of each of the arms of the slit and constitute respective thickenings. The protrusions terminate short of the central ridge of the V-form lips of the nozzle. Thus, the lips have their outlet zones more rigid and yet retain the necessary flexibility, so that sealing of the slit is improved and yet the lips can open wide.

10 Claims, 1 Drawing Sheet

CONTAINER FILLING NOZZLE MADE OF ELASTOMERIC MATERIAL

BACKGROUND OF THE INVENTION

1. Field of the Invention

This invention relates to a container filling nozzle.

2. Description of the Prior Art

Various container filling nozzles are known from for example, British Patent 2095584, Federal German Patent Application Publication 2107647, European Patent Application Publication 199538, and U.S. Pat. No. 3,186,451.

British Patent 2095584B discloses a valve unit to be used more especially in packaging machine of the type in which sealed nonreturnable packages for diary products such milk, yoghurt and the like, are filled one at a time by means of a metering pump. The unit comprises a check valve and a flexible nozzle having a slit normally urged closed by the resilience of the material. The flexible nozzle is disposed a short distance downstream of the check valve and the two items co-operate so as to prevent any after-dripping between pumping strokes. This is achieved in that the check valve with the help of a piston component, after the completed pumping stroke, creates a vacuum in the liquid filled, chamber, this vacuum affecting the flexible nozzle so that it closes rapidly and effectively. The nozzle is of a substantially cylindrical or truncated cone main shape which, however, is disturbed at the lower end of the nozzle by four recesses arranged symmetrically, which together give the lower extremity of the nozzle, which is the outlet extremity, the form of a cross, the outlet slit being of a correspondingly cruciform shape. In the angles of the cruciform shape of the outlet slit, the four recesses form four substantially triangular lugs which, because of the flexibility of the material, are capable of being folded out to a relatively wide open position, when the liquid passes through the nozzle. To obtain the desired flexibility of the nozzle, the nozzle is manufactured from soft plastics or rubber of a hardness of 25°-40° Shore. Since the nozzle is intended primarily for dairy products, the material selected is suitable for use jointly with foodstuffs, e.g. nitrile or silicone rubber.

It is desirable to avoid the need for a vacuum-creating piston component by employing solely the resilience of the material to obtain a good closure of the outlet slit. However, in order to obtain sufficient flexibility of the four lips of the nozzle, the nozzle wall needs to be made reasonably thin. Unfortunately, in practice, owing to the softness of the elastomeric material and to variations in the Shore hardness during manufacturing, the nozzle lips come unexpectedly open during their intended closed condition, so that the product being filled leaks out.

SUMMARY OF THE INVENTION

According to the present invention, there is provided a container filling nozzle comprised of elastomeric material and having an inlet opening and an outlet slit which, in the absence of any external force applied thereto, is maintained closed owing to the resilience of said material, said outlet slit, owing to the resilience of said material, being able to open to a relatively wide condition upon application of an appropriate external force to said nozzle, said nozzle have an internal surface which, at the zone of said outlet slit, is formed with an inward protrusion extending along said slit and constituting a thickening of the wall of said nozzle.

Owing to the inward thickening of the wall of the nozzle, the corresponding nozzle lip is made more rigid and yet retains a sufficient flexibility, so that sealing of the slit is improved and yet the lip can open wide.

BRIEF DESCRIPTION OF THE DRAWINGS

In order that the invention may be clearly understood and readily carried into effect, reference will now be made, by way of example, to the accompanying drawings, in which.

DESCRIPTION OF THE PREFERRED EMBODIMENT

Figure 1:
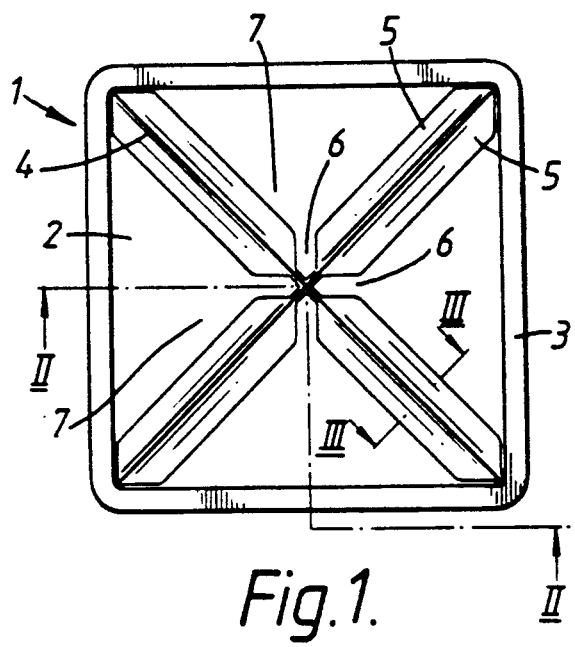
FIG. 1 shows a top plan view of a container filling nozzle.
Figure 2:
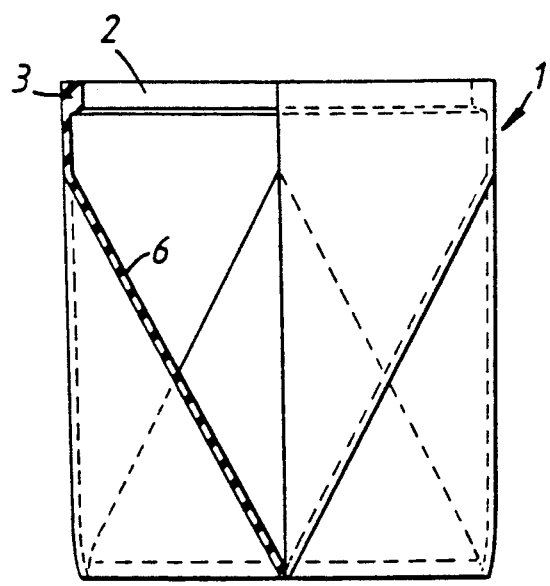
FIG. 2 shows a section taken on the line II—II of FIG. 1.
Figure 3:
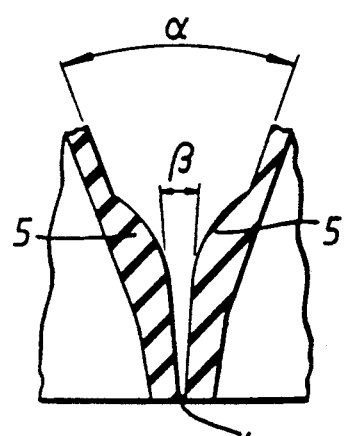
FIG. 3 shows a section taken on the line III—III of FIG. 1.

Referring to the drawings, the nozzle 1 is moulded in one piece from silicone rubber of a hardness of 50°-60° Shore. The nozzle has a relatively wide, substantially square inlet opening 2 with an inwardly projecting flange 3 for enaging above an annular bead projecting outwardly from the lower extremity of a filling pipe (not shown) of a liquid packaging machine for filling cartons of rectangular horizontal section. The lower end of the nozzle 1 is of a cruciform shape and has a cruciform outlet slit 4 formed therein. In the absence of any external force applied to the nozzle, the outlet slit 4 is maintained closed owing to the resilience of the silicone rubber. Also owing to the resilience of the silicone rubber, the outlet slit is able to open to a relatively wide condition under the pressure of liquid being pumped into the nozzle through the opening 2. Apart from the zones of the inlet opening 2 and of the outlet slit 4, the nozzle wall is of a substantially constant thickness. However, in the zone of the slit 4, the internal surface of the nozzle wall is formed with inward protrusions 5 which extend along both sides of each of the four arms of the slit 4 and constitute respective thickenings of the nozzle wall. The protrusions 5 terminate short of the central ridge lines 6 of the four V-form lips 7 of the nozzle 1. Thus, owing to the thickenings 5 provided at the outlet slit zone of each lip 7, but not elsewhere in that lip 7, the lips 7 have their outlet zones more rigid and yet retain the necessary flexibility for opening purposes. These characteristics are enhanced by the termination of the thickenings 5 short of the centeral ridge lines 6. The thickening of the outlet slit zones of the lips 7 discourages curving of those zones and thereby also has the effect of giving a relatively larger opening when the liquid is pumped through.

The angle α included by the inside surface of the wall of the nozzle as that surface approaches the outlet slit zone is advantageously between 30° and 50° and in the preferred embodiment shown is about 40°. The angle β included by the inside surfaces of the protrousions 5 as they approach the outlet slit 4 is between 5° and 15° and in the preferred embodiment is about 10°.

I claim:

1. A container filling nozzle comprised of elastomeric material and having an internal space which is bounded by an internal surface of said nozzle, an inlet opening provided by an open end of said nozzle and communicating directly with said internal space, an outlet slit provided by an end of said nozzle opposite to said open end and communicating directly with said internal space, said outlet slit, in the absence of any force applied to said nozzle, being maintained closed owing to the resilience of said material, and said outlet slit, owing to the resilience of said material, being openable to a relatively wide condition by action of an appropriate pressure in said internal space acting upon said internal surface, whereby a fluid stream may flow through said nozzle with said outlet slit being maintained open by pressure of said stream upon said internal surface, said internal surface, at the zone of said outlet slit, being formed with an inward protrusion extending along said outlet slit and constituting a thickening of the wall of the said nozzle.

2. A nozzle according to claim 1, wherein said wall of said nozzle is of substantially constant thickness except at the zones of said inlet opening and said outlet slit.

3. A nozzle according to claim 1, wherein said internal surface, at said zone of said outlet slit, is formed with a second inward protrusion extending along said outlet slit and constituting a second thickening of said wall of said nozzle, the first-mentioned thickening and said second thickening being situated at respective opposite sides of said outlet slit.

4. A nozzle according to claim 3, wherein the angle included by said internal surface as said internal surface approaches the zone of the outlet slit is between 30° and 50° and the angle included by the inside surfaces of the protrusions as they approach the outlet slit is between 5° and 15°.

5. A nozzle according to claim 4, wherein said angle included by said internal surface is about 40°.

6. A nozzle according to claim 4, wherein said angle included by said inside surfaces of the protrusions is about 10°.

7. A nozzle according to claim 1, wherein said outlet slit comprises a plurality of arms bounding substantially V-form lips of said nozzle, along one of which arms said protrusion extends, and wherein said internal surface, at said zone of said outlet, is formed with other inward protrusions extending along those arms other than the one arm and constituting other thickenings of said wall of said nozzle.

8. A nozzle according to claim 7, wherein said internal surface, at said zone of said outlet, is formed with further inward protrusions extending along said plurality of arms and constituting further thickenings of said wall of said nozzle, the first-mentioned thickening and said other thickenings being situated at respective opposite sides of said plurality of arms from said further thickenings.

9. A nozzle according to claim 8, wherein the first-mentioned inward protrusion, said other inward protrusions and said further inward protrusions terminate short of central ridge lines of said lips.

10. A nozzle according to claim 7, wherein the first-mentioned inward protrusion and said other inward protrusions terminate short of central ridge lines of said lips.

* * * * *